United States Patent Office 3,565,580
Patented Feb. 23, 1971

3,565,580
PROCESS FOR THE MANUFACTURE OF RUTILE PIGMENTS WITH ROUNDED-OFF PARTICLE FROM TITANIUM CHLORIDE SOLUTIONS
Edgar Klein, Odenthal, Achim Kulling, Opladen, Rudiger Paul, Leverkusen, and Helmut Steinhausen, Odenthal, Germany, assignors to Titangesellschaft m.b.H., Leverkusen, Germany, a corporation of Germany
No Drawing. Filed Feb. 10, 1969, Ser. No. 798,134
Claims priority, application Germany, Feb. 17, 1968, P 16 67 857.2
Int. Cl. C01g 23/04, 23/06
U.S. Cl. 23—202 2 Claims

ABSTRACT OF THE DISCLOSURE

The invention is concerned with a process for the manufacture of rounded-off rutile pigment particles by the hydrolysis of hydrochloric acid solutions containing titanium chloride solutions, which contain less than 0.2% silicic acid.

BACKGROUND OF THE INVENTION

Up to the present time it has not been possible to obtain pigments of uniform quality from titanium ores of varying origin. This has not been possible even when the analytical compositions of the solutions to be hydrolyzed were maintained constant in regard to their main constituents: titanium, iron, magnesium and chlorine. It has been found however, by electron-microscopic methods, that the pigment particles obtained by hydrolysis of titanium chloride solutions will differ in shape, some being acicular and some rounded-off. Naturally, transitions between the two shapes also occur. It is postulated therefore that it is this difference in the shape of the particles that produces variations in quality and is the cause for the differing behavior of such pigments in the various fields of application. For certain fields of application the acicular pigments are more suitable than the rounded-off pigments and vice versa.

To be sure, it has been possible using identical starting materials and the same digestion conditions to predict, using prior art procedures, that a hydrate comprising $TiO_2$ particles of uniform shape would be formed. However, given a digestion liquor of particular composition it has not been possible to produce a hydrate of desired particle shape, by varying the hydrolysis procedure and in this manner to secure special properties for certain applications; and since, depending on the desired application, acicular and rounded-off pigments have advantages over other shapes, considerable interest exists in producing hydrates of predetermined pigment particle shape of irrespective of the starting ore and the conditions of digestion.

It is known that titanium dioxide particles obtained under customary conditions by the hydrolysis of titanium chloride solutions with the addition of nuclei solution are in every case acicular and that by calcining these acicular hydrates under suitable conditions it is possible to obtain rounded-off pigment particles provided there are no growth retarding substances in the hydrate during calcination. It has been found that silicic acid is particularly growth retarding. In the presence of this substance, a rounding-off of the normally acicular particles may be achieved only by excessive over-calcination and/or the addition of growth promoting substances. However, when either of these techniques is used undesirable growth and sintering phenomena occur which have an unfavorable effect on pigment quality. The silicic acid in the $TiO_2$ hydrate has its origin in the digestion solution produced by digesting titanium ores containing silicon dioxide with hydrochloric acid. The silicon dioxide content of titanium ores will vary depending on occurrence and recovery. In general, it amounts to 0.1–5% $SiO_2$. However only the acid-soluble fraction which amounts to about 20% of the total $SiO_2$ content in the ore, goes into solution. During hydrolysis this acid-soluble fraction precipitates almost quantitatively with titanium dioxide hydrate without affecting the shape of the hydrate particles but serving nevertheless as a growth retardant during calcination to prevent rounding-off of the acicular particles.

SUMMARY OF THE INVENTION

It has now been found that rutile pigments comprising rounded-off particles may be produced from titanium chloride solutions containing silicic acid provided the silicic acid content of the hydrolysis solution is less than 0.2%, preferably less than 0.1% $SiO_2$, calculated on the basis of the titanium dioxide content.

DESCRIPTION OF PREFERRED EMBODIMENT

The degree of growth retardation by the silicic acid depends on the amount of the $SiO_2$—the higher the content, the greater is the growth-retarding effect. Amounts below 0.2% $SiO_2$, preferably below 0.1%, do not inhibit rounding-off during calcination. It is, therefore, sufficient to remove only the amount exceeding 0.2% prior to hydrolysis.

Known processes are suitable for the separation of excess silicic acid provided they prevent simultaneous precipitation of the titanium. Operations which favor a separation of the silicic acid by thermal treatment are not permissible in most cases owing to the hydrolysis of the titanium salts.

In order to avoid hydrolysis and thereby considerable titanium dioxide losses it is necessary not to employ temperatures over 90° C. Even in the digestion of the ores the formation of hydrated titanium dioxide particles that could act as hydrolysis nuclei must be largely prevented in view of the subsequent removal of silicic acid.

The digested silicic acid is present in the digestion solution partly in aggregated form, partly colloidal and the balance in molecular solution. The aggregated portion will precipitate out from the digestion solution without further measures in the course of the process and can be removed with the ferrous chloride or during subsequent filtration for the separation of fines from the solution. The colloidal and molecular portions also undergo aging in the course of the process; however, the customary conditions of the process are in most cases not sufficient to effect a reduction in the silicic acid content below the permissible upper limit of 0.2%.

However the lowering of the silicic acid content below this value can be effected successfully, if according to the teaching of L. Weiss and H. Sieger (Z. anal. Chem. 119 (1940) pp. 245–280) a flocculating agent such as glue, gelatine or other high molecular organic compound is added. However it is necessary, according to the instructions of the aforesaid authors, to subject the digestion solution to prolonged boiling so as to liberate and age the silicic acid in order that the addition of the flocculating agent will have a rapid precipitating effect. It was found, that heat treatment of the reduced digestion liquor, preferably not freed from the iron salts, by maintaining it for ½ hour, up to several hours, at a temperature of at least 75° C., but at most 90° C. was most effective for substantially completely precipitation of the silicic acid by the subsequent addition of a flocculation agent; and that without this heat treatment it is not possible to separate this silicic acid below the 0.2% level necessary for successful results.

The aforesaid thermal treatment of the digestion solution and subsequent flocculation may also be carried out after crystallization and separation of the ferrous chloride from the solution, the selection of an uncrystallized or crystallized solution for heat treatment and the length of heat treatment being dependent on a number of factors.

The high electrolyte content of an uncrystallized solution is advantageous for the heat treatment and flocculation since it promotes silicic acid separation. Besides that, an additional filtration step is eliminated by this procedure since the precipitated silicic acid is separated out during the customary processing steps for crystallization and separation of the crystallized iron and the finely divided digestion residues. This is an aid in keeping the cost for separating the silicic acid as low as possible. The aging and removal of the silicic acid from a crystallized solution, that is to say following separation of the crystallized iron and the finely divided digestion residue from the digestion solution, is recommended when it is particularly difficult to remove the silicic acid. This may occur if the prevailing gangue has an unfavorable composition. In this case the thermal treatment of the crystallized solution must be carried out at a temperature and for a period of time that lie at the upper permissible limit where considerable $TiO_2$ losses owing to hydrolysis may still be avoided. Moreover hydrolysis is largely avoided since any titanium dioxide hydrate particles that are present in small amounts in the solution prior to filtration and which may act as hydrolysis nuclei are removed during filtration of the iron and gangue materials. However, under these circumstances an additional filtration step is necessary to separate the flocculated silicic acid.

Besides the flocculation agents mentioned by L. Weiss and H. Sieger, there are in particular suitable higher molecular organic compounds which contain a fairly large number of OH- and/or $NH_2$ groups and/or NH-groups, for example, a copolymerizate of amines with amides.

The flocculating agent is added in the form of a dilute aqueous solution. Gelatine, for example, is added as a 1.0 to 2.0% solution; in the case of amino- amido- copolymerizates even lower concentrations are sufficient. The amounts needed must be determined experimentally. They depend essentially on the type of preliminary treatment of the digestion solution. The better the silicic acid is aggregated, the less flocculating agent is required. If the amount of flocculating agent added is insufficient, the consequence is not only incomplete flocculation but also the formation of a silicic acid gel which can only be filtered with difficulty or not at all.

After removal of flocculated silicic acid by filtration there is obtained a solution, according to the present invention, of which the $SiO_2$ content is at the most 0.1%, referring to titanium dioxide. When the hydrated titanium dioxide produced by hydrolysis of this solution in the known manner, is calcined without or with the addition of customary calcining additions such as potassium compounds at temperatures between 850 and 1000° C. the pigment particles all show rounded-off shapes, as evidenced by electron-microscope pictures. Moreover their pigmentary characteristics are not inferior to those of pigments of good quality obtained from sulfuric acid solutions.

The following examples will serve to explain the invention in more detail. The following conditions were common in all examples:

The starting material was an ilmenite ore with a $TiO_2$ content of 44% and an $SiO_2$ content of 2.8%. 30 kg. of this ilmenite were digested with 100 liters of 38% hydrochloric acid at a temperature up to 95° C. and reduced with scrap iron. One liter of the reduced digestion analyzed as follows: 125 g. $TiO_2$, of which 3 g. $TiO_2$ were in the form of $Ti^{3+}$; 1.5 g. $SiO_2$, 106 g. Fe, 11 g. MgO and 418 g. $Cl^-$.

The hydrolysis of this solution freed from the main portion of iron and, as the case may be, also of silicic acid to less than 0.1% $SiO_2$, was carried out with the addition of a nuclei solution which had been prepared from a titanium oxychloride solution with a mol ratio of $Cl:TiO_2=1.75$ and a $TiO_2$ content of 12.5 g.p.l. by heating for 15 minutes at 100° C. or by heating for 40 minutes at 85° C. To effect hydrolysis of this iron free digestion liquor 1 liter was brought up to 100° C., mixed with 360 ml. of the nuclei solution and heated for 2 hours at 105° C. The precipitate obtained was filtered off, washed with 10% $H_2SO_4$ and then with water, before being calcined.

The tinting strength of the pigments obtained, were determined according to a method described by P. B. Mitton and A. E. Jacobsen in "Official Digest," July 1962, pp. 704–715. According to this test the measurement of reflectance is carried out with three different color filters. The "Reflectance Green" related to a standard (Value A in the subsequent tables) is a measure for the tinting strength. The difference between the "Reflectance Blue" and the "Reflectance Red" (Value B in the following tables) is, in the case of pigments, a measure for mean particle size. With increasing particle size B decreases. Acicular pigment have, at equal mean particle mass, a B value which is 1.5 units lower than rounded-off pigments. A rounding-off of the particles leads therefore to an increase of B.

All pigments obtained were in addition examined by electron microscope.

Details of the procedure were as follows:

Example 1

1 liter of the reduced digestion liquor, prepared as described above, was subjected to thermal treatment by heating for 3 hours at 75° C. Subsequently the solution was mixed with 32 ml. of a 2% aqueous gelatine solution, cooled to 20° C. in order to crystallize out the iron salts and freed from the crystallized $FeCl_2 \cdot 4H_2O$ by centrifuging. For removal of the fine solids still present in the solution, a filtration step was carried out prior to the hydrolysis. The silicic acid content of the filtered solution was thereafter only 0.05%, referring to the titanium dioxide content. Following hydrolysis the hydrolyzate was calcined at increasing temperatures with the addition of 0.2% $K_2O$, referring to finished pigment.

The testing results are recorded in Table 1.

TABLE 1

| | A | B | |
|---|---|---|---|
| | Reflectance Green [1] | Reflectance Blue-Reflectance Red [2] | Particle shape [3] |
| Calcining temperature ° C.: | | | |
| 850 | 1,810 | +3.5 | Partially rounded. |
| 900 | 1,910 | +3.6 | Rounded-off. |
| 950 | 1,990 | +2.6 | Do. |
| 1,000 | 1,880 | +1.6 | Do. |

[1] Relative value, referred to Standard.
[2] Relative value, referred to Standard.
[3] By electronmicroscope.

It may be seen that the rounding-off of the particles already started at a calcining temperature as low as 850° C. A further increase of the calcining temperature resulted first in complete rounding-off of the particles and thereafter growth of the particles started which can be seen in a decrease of the B value.

The pigment calcined at 850° C. had a relatively high B value, i.e. a bluish hue in the gray system. On the other hand, the pigment calcined at 950° C. showed an essential improvement in the tinting strength, as can be seen from the A value. At calcining temperatures between 850 and 950° C. improvements in the tinting strength as well as in the hue were achieved.

Example 2

1 liter of the reduced digestion solution of Example 1 was heated prior to crystallization to 75° C. for 3 hours and mixed with 16 ml. of a 2% aqueous solution of a copolymerizate of an amine and amide. After cooling of the solution, removal of the iron salts and subsequent separation of the fines by filtration, the SiO₂ content of the solution, referring to TiO₂ was 0.04%. The pigment prepared from this solution with the addition of 0.2% potassium compounds, calculated as K₂O, showed the same properties as Example 1.

The following example shows the results obtained at deficient silicic acid separation when using the same digestion solution:

Example 3

The reduced digestion liquor of Example 1 was cooled to 20° C., freed from crystallized ferrous chloride by centrifuging and from the residual fine solids by filtration. The solution obtained still contained 0.7% SiO₂ referring to TiO₂. The hydrolyzate obtained from this solution was calcined at increasing temperatures with the addition of 0.28% K₂O, referring to finished pigment. The pigment was tested as hereinabove described and had the following properties recorded in the following table.

TABLE 2

| Calcining temperature, ° C.: | A Reflectance Green [1] | B Reflectance Blue-Reflectance Red [2] | Particle shape [3] |
|---|---|---|---|
| 850 | 1,825 | +2.1 | Acicular. |
| 900 | 1,820 | +2.1 | Do. |
| 950 | 1,825 | +2.3 | Do. |
| 1,000 | 1,830 | +2.4 | Do. |

[1] Relative value, referred to Standard.
[2] Relative value, referred to Standard.
[3] By electronmicroscope.

This experiment confirmed the fact that only acicular rutile pigments has been produced owing to the relatively high silicic acid present. On account of the extreme growth retardation, the pigment properties were hardly dependent on the calcining temperature. Compared with the pigments of Example 1, the B value was lowered which is indicative of deficient rounding-off and effects an undesirable yellowish hue in the gray system.

Example 4

The procedure of this example was the same as described in Example 3. Instead of K₂O, however, 1% MgO, referring to the finished pigment, was added in the form of a MgCl₂ solution. This calcining addition was supposed to promote particle growth.

The results of the tests can be seen from Table 3.

TABLE 3

| Calcining temperature, ° C.: | A Reflectance Green [1] | B Reflectance Blue-Reflectance Red [2] | Particle shape [3] |
|---|---|---|---|
| 850 | 1,775 | +2.1 | Acicular. |
| 900 | 1,800 | +1.2 | Partly rounded-off. |
| 950 | 1,720 | −0.5 | Rounded-off. |
| 1,000 | 1,370 | −3.8 | Do. |

[1] Relative value, referred to Standard.
[2] Relative value, referred to Standard.
[3] By electronmicroscope.

Thus, while rounding-off was affected without separation of the silicic acid by adding a growth-promoting agent at calcination, a deterioration of the pigment resulted. It can be concluded from the low B values of the rounded-off pigments that the particles were very coarse. Moreover the tinting strength (A-values) correspondingly went down considerably. The pigments obtained in this manner were accordingly clearly inferior to those that had been prepared from the same digestion liquors, free of silicic acid (<0.1% SiO₂), applying the same method of precipitation.

While this invention has been described and illustrated by the examples shown, it is not intended to be strictly limited thereto, and other variations and modifications may be employed within the scope of the following claims.

We claim:

1. Process for producing round-like rutile TiO₂ particles comprising digesting a titaniferous material with hydrochloric acid to produce a titanium chloride solution containing iron chlroide values and silicic acid the amount of silicic acid in solution being substantially more than 0.2%, calculated as SiO₂ on a TiO₂ basis, reducing the iron values of said titanium chloride solution and heating the reduced solution at a temperature in the range of 75° C. to 90° C. and for a period of time to aggregate said silicic acid but below the temperature for hydrolyzing the titanium values, adding a flocculating agent to the reduced solution to flocculate said silicic acid aggregate, separating the reduced iron chloride values and flocculated silicic acid aggregate from said titanium chloride solution by cooling said solution and crystallizing said reduced iron chloride values, removing said crystallized iron chloride and said flocculated silicic acid aggregate by filtration, thus producing a titanium chloride solution containing less than 0.1% silicic acid on a TiO₂ basis, heating said hydrolysis solution to precipitate hydrous TiO₂ and then calcining said hydrous rutile TiO₂ to produce round-like rutile TiO₂ particles.

2. Process for producing round-like rutile TiO₂ particles according to claim 1 wherein the flocculating agent comprises a high molecular weight compound selected from the group consisting of gelatine, glue and copolymerizates of amines and amides.

References Cited

UNITED STATES PATENTS

| 2,113,945 | 4/1938 | Plechner et al. | 23—202 |
| 2,622,964 | 12/1952 | Aagaard et al. | 23—202 |
| 2,980,509 | 4/1961 | Frey | 23—202 |
| 3,060,002 | 10/1962 | Leddy et al. | 23—202 |
| 3,069,235 | 12/1962 | Schechter et al. | 23—202 |
| 3,202,524 | 8/1965 | Richmond | 23—202X |
| 3,407,033 | 10/1968 | Ruter et al. | 23—87 |

EDWARD STERN, Primary Examiner

U.S. Cl. X.R.

23—87, 182; 106—300